United States Patent [19]
Kaufman et al.

[11] 4,388,423
[45] Jun. 14, 1983

[54] FRICTION LINING MATERIAL
[75] Inventors: Edward R. Kaufman, Andover; Gregory R. Benson, Dracut; Alfred Shaines, Waban, all of Mass.
[73] Assignee: Glennco Trust, Lawrence, Mass.
[21] Appl. No.: 402,835
[22] Filed: Jul. 29, 1982

Related U.S. Application Data
[63] Continuation of Ser. No. 316,784, Nov. 2, 1981, which is a continuation-in-part of Ser. No. 98,996, Nov. 30, 1979, and Ser. No. 259,857, May 4, 1981.

[51] Int. Cl.$^3$ .............................................. C08J 5/14
[52] U.S. Cl. .................................... 523/153; 521/54; 523/155; 523/218; 524/407; 524/450
[58] Field of Search ...................... 523/218, 153, 155; 524/407, 450; 521/54

[56] References Cited
U.S. PATENT DOCUMENTS

| | | | |
|---|---|---|---|
| 2,012,259 | 8/1935 | Denman | 260/3 |
| 2,874,034 | 2/1959 | Rieke | 51/298 |
| 3,267,048 | 8/1966 | Horste et al. | 521/181 |
| 3,307,969 | 3/1967 | Quinn | 106/122 |
| 3,948,830 | 4/1976 | Donnelly et al. | 260/37 EP |

Primary Examiner—Morton Foelak
Attorney, Agent, or Firm—Wolf, Greenfield & Sacks

[57] ABSTRACT

A friction material for use as a brake lining in automobiles, trucks, buses or similar vehicles. The brake lining contains no more than traces of asbestos and utilizes the mineral vermiculite as a basic constituent. The formulation of the brake lining comprises a non-fibrous natural or synthetic mineral or mineral-like material together with a small quantity of non-asbestos fibers and acicular mineral particles which on being compressed at ambient temperatures and at pressures of 1700 to 2600 p.s.i. has significant green strength in the order of 2 to 25 p.s.i. and also has appropriate thermal resistance, frictional properties, and shear and flexural strengths, together with a thermosetting resin as the basic components together with other organic and inorganic materials as friction modifiers and fillers. The mineral preferably comprises vermiculite, and together with the resin comprises preferably about 35% to 95% by weight of the brake lining formulation. The ratio by weight of resin to vermiculite is preferably in a range having a upper limit not exceeding about 1.2/1 to 1.5/1 and a lower limit not less than about 0.15/1.

17 Claims, No Drawings

FRICTION LINING MATERIAL

This application is a continuation of application Ser. No. 316,784 filed Nov. 2, 1981.

SUBJECT MATTER OF THE INVENTION

The present invention relates to an improved brake lining utilizing a mineral such as vermiculite as a basic component, and further relates to the use of such material in the manufacture of composite friction materials in which the manufacturing process involves the production of a preform.

DESCRIPTION OF THE PRIOR ART

The prior art discloses brake lining for use in automotive, truck, bus, or similar vehicles as well as off-the-road equipment such as farm machinery and construction equipment. Varying compositions for the brake lining are disclosed in the prior art, but predominantly the prior art brake lining consists of two basic systems. In one system, organic or inorganic fibers are dispersed in a resin composition. The fibers are ordinarily asbestos, metal, other minerals or glass and are used for strength, thermal and frictional properties. The other system comprises a sintered metal in combination with metal oxides. In this latter system there are no organic binders. Of these systems, the first, which uses asbestos as the fiber, is the most popular because asbestos is relatively inexpensive, is easily preformed and provides a brake lining having excellent wear, durability, friction and strength properties. However, asbestos has been found to expose workers making or installing the brake linings as well as the public to a potentially serious health hazard. It has been determined in recent years that the inhalation of small asbestos fibers can result in a disease known as asbestosis in which these fibers accumulate on the lungs, scar lung tissue, and may cause many respiratory problems. It has become increasing clear that inhalation of asbestos fibers over an extended period of time can lead to a cancer of the lining of the lungs known as mesothelioma as well as lung cancer. In view of these recent findings under investigations conducted by the federal government as well as private concerns, it has become urgent to find substitutes for asbestos in those applications involving the manufacture and use of materials containing asbestos.

In the operation of conventional asbestos-based brake lining, as the brake lining wears away some of the asbestos discharges into the atmosphere in its fibrous form posing a potential hazard. In view of the potential hazard of asbestos materials, it has become increasingly desirable for manufacturers of friction materials such as asbestos-based brake lining to find suitable substitutes for asbestos. While mineral and metal fiber material have been substituted for the fibrous asbestos material, brake linings employing such materials to date have had inferior physical strength and brittleness. These materials are also very heavy and costly to manufacture and as a result such substitute formulations have had only limited applicability. Other materials have been tried in brake linings and related products but are unacceptable because of difficulties in preforming and because of prohibitive costs of materials and processing. Therefore, the search for substitutes for asbestos in recent years has concentrated on fibrous materials such as glass fibers, steel wool fibers, iron filings, mineral wool fibers, and comparable fibrous materials. An example of these alternatives is illustrated in U.S. Pat. No. 2,012,259. This patent teaches the substitution of talc called asbestine. This material is, however, a short fiber material and therefore may have some of the same health hazards associated with asbestos. Some effort has been made to incorporate a non-fiber material such as perlite (see U.S. Pat. No. 3,307,969) in a friction material. However, such compositions in U.S. Pat. No. 3,307,969 contain asbestos as a major constituent, and the resultant product is not capable of being preformed, since perlite has no green strength when compressed. While some of these substitutes provide the strength and others provide the frictional properties and still others provide wear resistance, none of these has as yet been found to provide all of these properties coupled with economical material and manufacturing costs. In addition, many of these fibers may themselves pose potential health hazards. Therefore, a brake lining formulation which contains minor amounts of fibrous materials and no asbestos, yet produces a brake lining material comparable to conventional asbestos-based brake lining in wear, durability, friction and strength, would be an important improvement over the prior art.

SUMMARY OF THE INVENTION

It is an object of the present invention to provide an asbestos-free brake lining which has wear, durability, friction and strength characteristics comparable to or exceeding those of conventional asbestos type brake linings.

It is also an object of the present invention to provide a non-asbestos composition of material which can be shaped into brake pads, discs, and the like using a conventional process of first compressing the composition at ambient temperatures into a preform and subsequently subjecting the preform to compression at elevated temperatures.

A further object of the present invention is to provide a brake lining composition having a minor amount of non-asbestos fiber or combination of non-asbestos fibers and acicular mineral particles which prevents surface cracking.

It has been determined that a brake lining comprised of vermiculite and a thermosetting resin having heat resistant properties, preferably phenol formaldehyde, produces a satisfactory asbestos-free brake lining. Alternative thermosetting resins may include phenol furfural, melamine formaldehyde, epoxy resins, cross-linked alkyd resins, diallyl phthalate resins, urea-formaldehyde, heat bodied linseed oil and cashew nut liquid resins. It has been found that a satisfactory brake lining is produced if the weight ratio of resin to vermiculite is in a range having a upper limit not exceeding about 1.2/1 to 1.5/1 and a lower limit not less than about 0.15/1. A suitable range is between about 1.2/1 and 0.15/1, preferably 1.2/1 to 0.4/1. The total weight percent of resin plus vermiculite in the brake lining is preferably between about 35% and 95%. The addition of up to 15% by weight of non-asbestos fibrous materials such as sisal and fiberglass or the addition of up to 30% of a combination of a non-asbestos fibrous material such as sisal and an acicular mineral particle such as wollastonite prevents surface cracking during use of the resultant product. The remainder of the mixture is comprised of filler components.

A satisfactory mixture of filler components of automobile disc pads brake lining or truck blocks or segments to be used in conjunction with the vermiculite-resin combination has been found to consist of cashew-based friction particles, brass chips, soft bituminous coal, chromite ore, calcium carbonate and graphite, or their equivalents.

In the case of roll-brake lining which is used for passenger car drum brakes, a heat bodied linseed oil is preferred; however, the above-cited group of thermosetting resins preferably in liquid form is also suitable. A satisfactory mixture of filler components for roll-brake lining has been found to consist of bituminous coal, calcium carbonate, barium sulphate, brass chips, talc, sulphur and hydrated lime.

The method of manufacture of the brake linking in the form either of disc pads for typical application in passenger cars or block or segment lining for typical application in trucks usually consists of a preforming step followed by a molding step. Generally, the preforming step is carried out by subjecting the mixture of dry constituents to pressures of between 300 and 5500 p.s.i.g. at room temperature for a period of at least two seconds, and preferably between two seconds and two minutes, depending on the size and thickness of the part. The resulting preform is then subjected to a molding step wherein the preform is compressed at pressures of approximately 1500 to 2500 p.s.i.g. at a temperature of about 280° F. to 360° F. for 4 to 14 minutes depending upon the size and thickness of the part.

A preferred method of manufacture of the brake lining in the form of disc pads for typical application in passenger cars or block or segment lining for typical application in trucks consists of subjecting the mixture of dry constituents to pressures between 300 and 5500 psig at room temperature for a period of at least two seconds and preferably between two seconds and two minutes depending on the size and thickness of the part. The resulting preform is then heated dielectrically by placing it in a dielectric or microwave heater or oven until its internal temperature reaches between 150° and 190° F. The exact temperature will depend on the surface area per unit volume of preform. The hot preform is then subjected to a molding step wherein the preform is compressed at pressures of approximately 1500 to 2500 psig at a temperature of about 280° F. to 360° F. for 2 to 14 minutes depending on the size and thickness of the part.

The dielectric preheating of the preform reduces the overall pressing cycle and makes for a more economical manufacturing process. It also achieves a more complete flow and cure of the resin binder which, in turn, makes a product with greater strength.

Because of the accordian and plate-like structure of vermiculite, higher mold temperatures in the hot pressing operation or the use of a conventional convection oven to preheat the preform tend to cure and harden the outer surfaces and do not permit the center of the preform to heat sufficiently to bind the vermiculite and other filler particles adequately.

Table 1 gives the flexural strengths of six disc pads made by preheating the preforms and six pads molded at ambient temperatures.

TABLE 1

| Flexural Strength (psi) | |
| --- | --- |
| Preheated Preform | Cold Preform |
| 517 | 430 |
| 470 | 439 |
| 452 | 423 |
| 433 | 449 |
| 460 | 408 |
| 457 | 406 |

After the molding step the molded discs, blocks and segments are baked in a oven at about 350° F. for about seven hours.

The method of manufacturing of roll-lining brake material for typical application in passenger cars usually consists of continously compressing the wet mixture between rolls and then baking the compressed mixture at about 300° F. to 350° F. for a period of about 10 to 15 hours.

DESCRIPTION OF THE PREFERRED EMBODIMENT

A preferred brake lining of the invention is composed of vermiculite, preferably expanded vermiculite, resin, minor amounts of a non-asbestos fibrous material and filler components. Acicular mineral particles may be used in place of some of the fibrous material, fillers or vermiculite. The vermiculite and resin in the preferred embodiment may have a total composition in the mixture in the range between 35% and 95% by weight. Preferably the non-asbestos fibrous material in the mixture should be between 5% and 15% by weight of the total composition, or alternatively, the combination of non-asbestos fibrous materials and acicular mineral particles should be between 5% and 30% of the weight of the mixture. The filler components (i.e. components other than resins, fibers, acicular mineral particles and vermiculite) may comprise 5% to 65% by weight of the brake lining composition. It has been determined by experiment that a brake lining having a combined weight of vermiculite and resin in the range between 35 and 95 weight percent and having a weight ratio of resin to vermiculite in a range between 1/2/1 and 0.4/1, and having non-asbestos fibers between 5% and 15% by weight of the brake lining composition or a combination of non-asbestos fibers and acicular mineral particles in the range between 5% and 30% by weight of the brake lining composition produces a particularly strong and durable brake lining which is easily preformed and molded. While the preferred embodiment includes between 5% and 15% by weight of non-asbestos fibers or between 5% and 30% by weight of a combination of non-asbestos fibers and acicular mineral particles, satisfactory brake lining may also be produced from compositions without any fibers. It has been discovered that the absence of such non-asbestos fibers or combination of non-asbestos fibers and acicular mineral particles may increase the possibility of surface cracks[1] developing in use, and, in addition, a greater amount of resin must be used in the non-preferred embodiment resulting in an increased tendency of the product of fade[2].

[1]. It is hypothesized that visible surface cracks in brake disc pads develop through the propagation of microscopic or submicroscopic cracks which are either molded into the part or result from the drilling of the disc pads. These cracks then open up or propagate as the part vibrates or flexes and puts the surface in tension.
[2]. Fading is a phenomenon of friction materials manifested by a decrease in the coefficient of friction with an increase in temperature at the friction surface. With respect to brake lining materials, the application of the brakes in rapid succession will cause the braking surfaces to get hot. If the friction material "fades", more and more force (brake pedal pressure) will be required to stop the vehicle. This loss is attributed to the evolution of gas at the surface which creates a solid/gas/solid interface with a concomitant lower coefficient of friction.

The preferred embodiment also includes graphite and chromite. The graphite is included primarily to permit removal of the preform from the mold. Since we have discovered that the use of graphite increases the fading characteristics, we have determined that this tendency to fade can be overcome by the addition of chromite ore to the formula. The addition of the chromite ore does not adversely affect the release of the preform or otherwise adversely affect the manufacturing process or performance.

The relative percentages of vermiculite and resin determine the wear and processability characteristics.

When the relative amount of vermiculite is high the wear is high; conversely, when the amount of resin is comparatively high the composition becomes difficult to process and the resulting product has a tendency to fade. Since there appears to be no abrupt change in the properties with change in composition, the recited range is intended to define a spectrum of commercially preferred materials.

The resinous material used in the brake lining of the present invention may be generally any thermosetting resin having heat-resistant properties sufficient to withstand temperatures up to 1000° F. It has been determined that phenol formaldehyde, phenol furfural, melamine formaldehyde, epoxy resins, cross-linked alkyd resins, diallyl phthalate resins, and urea-formaldehyde thermosetting resins form particularly suitable binders with vermiculite. Additionally, cashew nut liquid resins, drying oils such as china wood oil and heat bodied linseed oil, latices, and elastomeric resins are suitable. A phenol formaldehyde resin suitable for use in the present formulation is available from Schenectedy Chemicals Co., Inc. of Schenectedy, N.Y. and is manufactured under the catalog code SP6416.

Vermiculite is a hydrated magnesium-aluminum-iron silicate having in its natural form a platelet-type crystalline structure and in its expanded form an accordian-like structure with a typical diameter of about 1 mm and a typical length of about 3 mm. An expanded grade of vermiculite mineral crushed to particle size no larger than 3.5 mm and no smaller than 0.15 mm is preferred for use in the present invention. A vermiculite of the designation Montana expanded grade vermiculite is particularly suitable. A typical weight analysis of Montana vermiculite ore is given as follows: $SiO_2$ 38.64%, MgO 22.63%, $Al_2O_3$ 14/94%. $Fe_2O_3$ 9.29%, $K_2O$ 7.84%, CaO 1.23%, $Cr_2O_3$ 0.29% $Mn_3O_4$ 0.11%, Cl 0.28%. A vermiculite mineral of this type is readily obtained from W. R. Grace & Co. under the trade name designation "Industrial Vermiculite".

A microscopic examination of industrial vermiculite indicates that it has a three-dimensional accordian structure with typical particle maximum diameter of 1 mm and length of 3 mm.

It has been determined that asbestos, which is commonly employed in conventional brake linings typically comprising about 40 wt% to 60 wt%, can be eliminated when the above-stated brake lining composition of the invention containing vermiculite is used. The only asbestos present in the formulation of the invention is a trace amount of less than 0.5 wt% in the vermiculite itself.

At this level the trace asbestos provides no reinforcing or other properties to the brake lining. The vermiculite when used as an asbestos substitute in addition to providing much of the friction and wear properties of asbestos additionally functions in part as a reinforcing agent, thermal stabilizer and filler. The reinforcing property of the vermiculite is unexpected in view of its nonfibrous character. The present formulation employing vermiculite has the significant advantage that a noncarcinogenic material has been substituted for the asbestos, a known carcinogen, without sacrifice in the wear or strength properties of the brake lining.

The filler components comprising the brake lining formulation of the invention may range from 0 to 65% by weight of the total mixture and from 0 to 60% in the preferred embodiment.

Although substitutes for these filler components are possible, a particularly suitable formulation for disc brake lining or block or segment lining is one component group wherein the filler components (i.e., components other than resin, fiber, or vermiculite) consists of the components designated in Table 2 in the approximate portions indicated as wt. percent of the total filler component group.

TABLE 2

| Typical Filler Components, Wt % of Filler Component Group | |
|---|---|
| Friction Particles | 17. |
| Brass Chips | 3. |
| Sea Coal | 9. |
| Chromite | 4. |
| Marblewhite | 27. |
| Graphite | 40. |
| | 100. |

The friction particles are preferably a cashew-based material such as cashew shell oil-based friction particles. Suitable cashew-based friction particles are available from Colloid Chemicals, Inc., having its main office in Cedar Knolls, N.J. and are sold under grade No. 6250-30. It is theorized that these particles serve to control the friction and wear of the brake lining.

The brass chips may be any clean brass chips. Typically, these chips may have an average particle size of about 0.4 mm in thickness and 3 mm in length. Other brass chips either larger or smaller may also be used. The brass chips provide additional abrasive properties, it is theorized, and also serve to clean the brake rotor or drum. Alternatively, instead of brass, chips such as zinc of about the same size may be used.

The sea coal used is a preferred grade of ground bituminous (soft coal) and may be obtained from Whitehead Brothers Co., having its main office in Florham Park, N.J. It is theorized that the seal coal provides the necessary friction in the 200°–400° F. temperature range. Alternatively, instead of sea coal other types of coal such as anthracite may be used.

The chromite is a chrome ore containing typically about 40 wt% $Cr_2O_3$ and 25 wt% $Fe_2O_3$, 15 wt% $Al_2O_3$, 14 wt% MgO and 6 wt% $SiO_2$. A chromite ore suitable as a filler may be obtained from Foote Mineral Company having a main office at Route 100, Exton, Pennsylvania. The chromite should be ground to an average particle size of about 325 mesh. The chromite, it is theorized, offsets some of the fading which would be caused by the graphite and resin and controls the friction level. Alternatively, many other minerals such as red iron oxide or fused aluminum oxide could be substituted for chromite.

The marblewhite has the composition calcium carbonate and may be purchased from Pfizer Co. having a principal place of business in Clifton, N.J. Alternatively, other filler materials instead of marblewhite such as barium sulfate (barytes) may be used.

The graphite used is preferably of grade 608A (industrial designation) and may be purchased in powdered form from Superior Graphite Co. having its main office in Chicago, Ill. The graphite is used in the brake lining as a lubricant and in connection with the vermiculite formulation of the invention to aid in ejecting the preformed disc pads from the molds. Alternatively, many other grades of graphite in flake or powder form may be used.

A typical composition for the disc, block or segment brake lining of the invention is set forth in Table 3.

TABLE 3

|  | WT % |
| --- | --- |
| Resin | 20.8 |
| Expanded Vermiculite | 45.2 |
| Friction Particles | 5.9 |
| Brass Chips | 1.1 |
| Sea Coal | 3.2 |
| Chromite | 1.3 |
| Marblewhite | 9.0 |
| Graphite | 13.5 |
|  | 100.0 |

It will be noted that in the composition set forth in Table 3 the resin plus expanded vermiculite comprise 66% of the mixture and the filler components comprise 34% of the mixture. With the individual filler component distribution as in Table 2 and the filler components at 34% of the total mixture, brake linings of the invention were manufactured at various ratios of resin to vermiculite. Six brake lining compositions were prepared, each with a total filler content of 34 wt% of the mixture and distributed as in Table 3 and with resin-to-vermiculite weight ratios at 1.5, 1.2, 0.46, 0.4, 0.27 and 0.15, respectively. The six brake lining compositions were then subjected to moldability, friction, strength and wear tests as reported in Table 4. The test results for preforming and moldability characteristics were compared to results obtained with a conventional asbestos type brake lining having a composition 53 wt% asbestos, 15 wt% phenolic resin, 10 wt% cashew particles, 6 wt% rubber particles, 4 wt% zinc chips, 1 wt% carbon black, 7 wt% brass chips and 4 wt% calcium aluminate.

The ingredients were first blended in a Littleford Mixer. The mixed ingredients were then put into a preform mold cavity having roughly the desired product shape. The mixture was then compressed at room temperature and at a pressure of about 2600 p.s.i. for a period of about 15 seconds. The preformability characteristics of the brake lining composition resulting from the preforming step and the ease with which the preformed part could be ejected from the preforming mold cavity (ejectability) were compared with results obtained with a conventional type brake lining having the above-cited composition.

The preform was then removed from the preforming mold cavity and was subjected to a molding step. In the molding step the preform was placed into a second mold cavity of similar shape wherein it was compressed at pressures of approximately 1,900 p.s.i. at a temperature of about 320° F. for a period of about 4 minutes. The molded pads were then ground and drilled to their specifications. During the molding step three characteristics of the product were evaluated and recorded in Table 4 and compared with results obtained from the above-cited conventional asbestos-type brake lining.

The three characteristics evaluated were: (a) the flowability of the material within the mold; (b) its tendency to blister and form air pockets; and (c) its tendency to stick in the mold. They show that for all ratios of resin to vermiculite between 1.5 and 0.15, the formulations are able to be preformed as well or better than the conventional asbestos formulation, but that its moldability as evidenced by flow, blisters and sticking is best at resin to vermiculite ratios of between 0.46 and 0.27.

The flexural and shear strengths as well as the friction and wear properties of the molded brake lining product of the invention were then measured and are also reported in Table 4.

A flexural strength of about 400 p.s.i. is currently considered well within the requirements of the automotive industry. Brake lining having a flexural strength as low as 200 p.s.i., or in some applications lower, are also considered satisfactory. All compositions except the one having a resin to vermiculite ratio of 0.15 had acceptable flexural strengths.

The shear strength of the molded brake lining product is a measure of the ability of the brake pad to withstand the braking forces which tend to shear the brake pad from the steel to which it is attached. The automotive industry currently requires a minimum shear strength of about 160 to 300 p.s.i. All ratios evaluated met this requirement.

The friction and wear tests as set forth by the Society of Automotive Engineers (SAE) Test Designation No. J661a have been applied to the brake lining of the invention and the results are reported in Table 4.

The hot friction coefficient is comparable to that coefficient of friction which results after the automobile rotor and brake lining have beem heated due to prolonged or repeated stopping. A range of 0.350 to about 0.450 for both the hot and cold coefficient of friction have been found to be suitable for most automotive and truck applications, but higher or lower coefficients of friction may be desirable depending on the particular application. Hot and cold friction coefficients of 0.550 and higher have been found to be required in some cases. SAE Test J661a also determines brake lining wear by measuring the decrease in sample thickness which occurs during the test. A decrease of up to 0.010 inch is considered reasonable. All ratios of resin to vermiculite except 0.15 had acceptable wear. During the test, the lining will tend to swell or grow in thickness. An increase in thickness no greater than 0.002 is considered acceptable.

Upon inspection of the test data of the brake lining of the invention reported in Table 4 for varying resin-to-vermiculite weight ratios for mixtures containing about 34 wt% of total filler components, it may be observed that ratios of resin-to-vermiculite in a range having an upper limit not exceeding about 1.2/1 to 1.5/1 and a lower limit not less than about 0.15/1, thus having a weight ratio between about 1.2/1 to 0.15/1, preferably 1.2/1 to 0.4/1, produce a brake lining product complying with the aforementioned criteria and modern test standards.

TABLE 4

Filler Content: 34 wt % of Total Mixture

| Wt. Ratio of Resin to Vermiculite | 1.5 | 1.2 | 0.46 | 0.4 | 0.27 | 0.15 |
|---|---|---|---|---|---|---|
| 1. Preforming | | | | | | |
| a. Preformability | ** | ** | ** | * | ** | * |
| b. Ejectability | 0 | 0 | ** | * | ** | * |
| 2. Moldability | | | | | | |
| a. Flow | 0 | * | ** | ** | ** | ** |
| b. Blisters | 0 | * | ** | ** | * | * |
| c. Sticking | 0 | * | ** | ** | ** | 0 |
| 3. Flexural Str. (psi) | 400+ | 400+ | 400+ | 362 | 400+ | 103 |
| 4. Shear Strength (psi) | 490 | 490 | 490 | 450 | 510 | 314 |
| 5. SAE J661a | | | | | | |
| a. Cold Friction Coef. | X | 0.388 | 0.392 | 0.387 | 0.398 | 0.398 |
| b. Hot Friction Coef. | X | 0.383 | 0.386 | 0.375 | 0.367 | 0.405 |
| c. Wear (inches) | X | 0.004 | 0.0072 | 0.007 | 0.009 | 0.014 |
| d. Swell (inches) | X | 0.003 | 0.0015 | 0.001 | 0.000 | −0.001 |

Note 1:
0 is somewhat less than satisfactory or unsatisfactory
*is satisfactory but less satisfactory than the asbestos based brake lining
**performance equal to or better than the asbestos based brake lining
X = could not run

TABLE 5

| Wt Ratio of Resin to Vermiculite | 1.5 | 0.46 | 0.15 | 1.5 | 0.46 | 0.15 |
|---|---|---|---|---|---|---|
| FILLER CONTENT Wt % of total Mixture | 45% | 45% | 45% | 25% | 25% | 25% |
| 1. Preforming | | | | | | |
| a. Preformability | ** | ** | * | ** | ** | * |
| b. Ejectability | * | ** | ** | 0 | * | ** |
| 2. Moldability | | | | | | |
| a. Flow | 0 | ** | ** | 0 | ** | ** |
| b. Blisters | 0 | * | ** | 0 | * | * |
| c. Sticking | 0 | ** | ** | * | ** | ** |
| 3. Flexural Str. (psi) | 400+ | 400+ | 15 | 390 | 400+ | 400 |
| 4. Shear Str. (psi) | 560 | 560 | 185 | 608 | 716 | 412 |
| 5. SAE J661a | | | | | | |
| a. Cold Friction Coef. | 0.413 | 0.405 | 0.415 | 0.320 | 0.385 | 0.390 |
| b. Hot Friction Coef. | 0.454 | 0.392 | 0.407 | 0.314 | 0.393 | 0.405 |
| c. Wear (inches) | 0.004 | 0.006 | 0.0128 | 0.0026 | 0.0059 | 0.018 |
| d. Swell (inches) | 0.0035 | 0.002 | −0.001 | 0.004 | 0.0025 | −0.003 |

Note 1:
0 is somewhat less than satisfactory or unsatisfactory
*is satisfactory but less satisfactory than the asbestos brake lining
**performance equal to or better than the asbestos brake lining

TABLE 6

| Resin/Vermiculite Ratio | 0.46 | 0.46 | 0.46 | 0.46 | 0.46 | 0.46 |
|---|---|---|---|---|---|---|
| Filler Content % by Wt. | 0 | 15 | 20 | 50 | 60 | 70 |
| 1. Preforming | | | | | | |
| a. Preformability | ** | ** | ** | ** | ** | * |
| b. Ejectability | 0 | * | * | * | * | * |
| 2. Moldability | | | | | | |
| a. Flow | ** | ** | ** | ** | ** | ** |
| b. Blisters | * | ** | ** | ** | ** | ** |
| c. Sticking | 0 | * | * | ** | ** | ** |
| 3. Flexural Str. (psi) | 400+ | 400+ | 400+ | 387 | 319 | 20 |
| 4. Shear Strength (psi) | 594 | 603 | 726 | 343 | 288 | 0 |
| 5. SAE J116a | | | | | | |
| a. Cold Friction Coef. | .362 | .375 | .394 | .388 | .382 | .322 |
| b. Hot Friction Coef. | .297 | .365 | .384 | .371 | .369 | .338 |
| c. Wear | .0147 | .0099 | .0088 | .0074 | .0067 | .0073 |
| d. Swell | +.001 | .0025 | .002 | .001 | −.0005 | −.0015 |

Note 1:
0 is somewhat less than satisfactory or unsatisfactory
*is satisfactory but less satisfactory than the asbestos based brake lining
**performance equal to or better than the asbestos based brake lining The same tests reported in Table 4 were then repeated over the same range in ratios of resin-to-vermiculite (i.e., between 1.5/1 and 0.15/1) but with the total filler components varied in a range between about 25 and 45 wt% of the total mixture. (The distribution of filler components or their alternative substitutes in this series of tests was approximately as that given in Table 2). Approximately the same test results reported in Table 4 were obtained at corresponding resin-to-vermiculite weight ratios with the filler components varied in a range between about 25 and 45 wt% of the total mixture. A specific illustrative set of test results for the latter series of tests are reported in Table 5 for specific cases—namely, a mixture comprised of a resin-to-vermiculite weight ratio between 0.15/1 and 1.5/1 and filler components between about 25 wt% and 45 wt.% of the total mixture.

Experiments were then conducted for total filler components ranging from 0 wt% to 70 wt% of the total mixture. The distribution of the filler components was approximately the same as given in Table 2. A specific illustrative set of test results over a range of filler components between 0 wt% and 70 wt% of the total mixture at a specific illustrative resin-to-vermiculite ratio of 0.46 is given in Table 6.

Based on all the tests it has been determined that a satisfactory product will result at a weight ratio of resin to vermiculite in a range having an upper limit not exceeding about 1.2/1 to 1.5/1 and a lower limit not less than about 0.15/1, with filler components in a range between 0 wt% and 65 wt% of the total mixture. With the filler components in a range between about 0 wt% and 65 wt% of the total mixture, a particularly satisfactory product results at a resin-to-vermiculite weight ratio in a range between 1.2/1 to 0.4/1 and more preferably at about 0.46/1.

Examples illustrative of the methods of manufacture of the brake lining of the invention for various applications are set forth as follows:

EXAMPLE 1

A method of manufacture and a disc pad brake lining for typical application in automobiles is given as follows:

Dry ingredients having the following composition were first thoroughly blended in a Littleford mixer:

|                     | WT % |
|---------------------|------|
| Expanded Vermiculite | 45.2 |
| Phenolic Resin       | 20.8 |
| Friction Particles   | 5.9  |
| Brass Chips          | 1.1  |
| Sea Coal             | 3.2  |
| Chromite             | 1.3  |
| Marblewhite          | 9.0  |
| Graphite             | 13.5 |
|                     | 100.0 |

About 150 gms of the mixture was then added to the preform mold having a shape approximately that of the desired product. The material was compressed under 2,600 p.s.i. at room temperature for about 15 seconds. The pressure was released and the compacted preform was then placed in a hot press mold. The preform was molded at about 350° F. for 4 minutes at a pressure of about 1,350 p.s.i. The cured pad was removed from the mold and post cured in an oven at 300° to 350° F. for 7 hours. The pad was machined to desired dimensions.

EXAMPLE 2

A method of manufacture and a block brake lining for application typically in heavy duty trucks is given as follows.

About 12 pounds of dry ingredients having the following composition were mixed in a Littleford mixing vessel:

|                     | WT % |
|---------------------|------|
| Expanded Vermiculite | 52.0 |
| Phenolic Resin       | 14.0 |
| Friction Particles   | 5.9  |
| Brass Chips          | 1.1  |
| Sea Coal             | 3.2  |
| Chromite             | 1.3  |
| Marblewhite          | 9.0  |
| Graphite             | 13.5 |
|                     | 100.0 |

The mixture was then compressed at about 350 p.s.i. pressure at room temperature for about 40 seconds to form the preform. The preform was then hot-pressed to the desired shape by molding in a hydraulic press at 300° to 360° F. for 14 minutes at a pressure of about 1,750 p.s.i. The cured slab was the removed from the mold and placed in a post-curing oven for 7 hours at 300° to 350° F. The slab was then cut, finish ground and drilled to desired specification.

EXAMPLE 3

A method of manufacture and a roll lining brake material for use in passenger cars is given as follows:

Approximately 20 pounds of ingredients having the following composition were blended in a Sigma mixer to form a wet mix batch:

|                     | WT % |
|---------------------|------|
| Expanded Vermiculite | 49.0 |
| Sea Coal             | 14.7 |
| Marblewhite          | 3.7  |
| Barytes              | 6.1  |
| Talc                 | 3.7  |
| Sulfur               | 1.5  |
| Hydrated Lime        | 1.0  |
| Brass Chips          | 0.1  |

-continued

|                     | WT % |
|---------------------|------|
| Heat Bodied Linseed Oil | 20.2 |
|                     | 100.0 |

The wet mixture batch was then fed to a 2 roll molding machine extruded at room temperature into a roll of compressed strip brake lining material approximately 2 inches wide by ¼ inch thick. The roll or brake lining material was then baked a 325° F. for 13 hours to produce a brake lining product material. The brake lining material was then cut into segments and finish ground.

EXAMPLE 4

11 pounds of the following ingredients in the following weight percentages were mixed in a Sigma mixer: Unexpanded Vermiculite Ore, 45.3 wt%; cashew-based friction particles grade No. 6250-30, 5.9 wt%; Brass Chips, 1.4 wt%; Sea Coal, 3.2 wt%; Chromite Ore, 0.7 wt%; Graphite, 13.6%; Marblewhite 9.0 wt%; Phenol formaldehyde resin, 20.8 wt%. The mixture was processed at ambient temperatures and 1000 p.s.i. pressure to form a preform. The preform was then hot pressed at 300°–300° F. for four minutes at 1850 p.s.i. to form a friction material. The resultant friction material was postbaked for seven hours at 325° F. and ground and drilled to specification. The mixture was slightly more difficult to preform and to mold than the conventional asbestos-based disc pad and was more prone to chipping; however, a suitable friction material for use as a brake lining was made. The friction, wear, and strength properties were found to be substantially the same as that reported in Table 3 for the corresponding resin-to-vermiculite weight ratio; however, the flexural strength was found to be somewhat lower, approximately about 60 to 200 p.s.i.

The examples set forth above will provide satisfactory braking. However, certain further modifications of the formulations have resulted in brake linings which fade less and develop no surface cracks in use. In substance, the resin and graphite contents are slightly reduced, the chromite content is slightly increased and minor amounts of sisal and wollastonite, an acicular mineral particle, or fiberglass are added.

The graphite is reduced from a range by weight of total composition from 13.5% to 18% to a range in the preferred embodiment from 6.75% to 13.5%. The resin is reduced from a range by weight of 19% to 23% to a range in the preferred embodiment of 17% to 19%. The chromite content is increased from a range by weight of 0.7% to 1.4% to a range in the preferred embodiment of from 1.4% to 2.0%. The non-asbestos fiber added to the preferred embodiment comprises between 5% and 15% by weight of the total composition, of which at least 5% to 7½% by weight of the total composition should be a fiber such as sisal having a fiber length of about ¼ inch and a cross-sectional area of about $49 \times 10^{-6}$ square inch and 0% to 7½% of the total composition of either wollastonite or milled fiberglass, or any fiber or acicular mineral particle having an average length of about 1/16 inch and a cross-sectional area of $7.8 \times 10^{-6}$ square inch.

Within the ranges set forth above for the preferred embodiments, a decrease in the relative content of resin will result in a decreased tendency to fade only if there is a concomitant decrease in the graphite content so as to maintain the relative weight percentage at the same level. In an alternative preferred embodiment, the graphite content is maintained at 6.75 to 13.5 wt.%, the resin at 17 to 19 wt.% and chromite at 1.4 to 2.0 wt.%. The mixture also contains expanded vermiculite in the range of 25 to 40 wt.% and non-asbestos fiber such as sisal having a fiber length of about ¼ inch and a cross-sectional area of about $49 \times 10^{-6}$ square inch in the range of 3 to 7.5 wt.% and an acicular mineral particle such as wollastonite having an average length of about 1/16 inch and a cross-sectional area of about $7.8 \times 10^{-6}$ square inch in the range of 5 to 30 wt.%.

If the relative resin content is reduced, it is preferable, within the ranges set forth above, to increase the fiber content in order to maintain strength and minimize cracking.

Examples illustrative of the methods of manufacture of the brake lining of the invention incorporating the above further modifications of the formulations are set forth as follows:

EXAMPLE 5

A preferred method of manufacture and a disc pad brake lining for typical application in automobiles is given as follows:

Dry ingredients having the following composition were first thoroughly blended in a Littleford mixer:

|  | WT % |
|---|---|
| Expanded Vermiculite | 44.5 |
| Phenolic Resin | 19.1 |
| Friction Particles | 5.8 |
| Brass Chips | 1.1 |
| Chromite | 1.8 |
| Marblewhite | 8.9 |
| Graphite | 8.8 |
| Wollastonite | 5.0 |
| Sisal | 5.0 |
|  | 100.0 |

About 150 gms of the mixture was then added to the preform mold having a shape approximately that of the desired product. The material was compressed under 2,600 psi at room temperature for about 2 seconds. The pressure was released and the compacted preform was then placed in a hot press mold. The preform was molded at about 340° F. for 4 minutes at a pressure of about 1,850 psi. The cured pad was removed from the mold and post cured in an oven at 300° to 350° F. for 7 hours. The pad was machined to desired dimensions.

EXAMPLE 6

A preferred method of manufacture and a block brake lining for application typically in heavy duty trucks is given as follows:

About 12 pounds of dry ingredients having the following composition were mixed in a Littleford mixing vessel:

|  | WT % |
|---|---|
| Expanded Vermiculite | 46.9 |
| Phenolic Resin | 17.0 |
| Friction Particles | 5.8 |
| Brass Chips | 1.1 |
| Chromite | 1.4 |
| Marblewhite | 8.9 |
| Graphite | 8.9 |
| Sisal | 5.0 |
| Milled Fiberglass | 5.0 |

|  | WT % |
|---|---|
|  | 100.0 |

The mixture is then compressed at about 350 psi pressure at room temperature for about 20 seconds to form the preform. The preform is then hot pressed to the desired shape by molding in a hydraulic press at 330° F. for 14 minutes at a pressure of about 1,750 psi. The cured slab is then removed from the mold and placed in a post curing oven for 7 hours at 300° to 350° F. The slab is then cut, finish ground and drilled to desired specification.

EXAMPLE 7

Another preferred method of manufacture and a disc pad brake lining for typical application in automobiles is given as follows:

Dry ingredients having the following composition were first thoroughly blended in a Littleford mixer:

|  | WT % |
|---|---|
| Expanded Vermiculite | 48.9 |
| Friction Particles | 6.4 |
| Brass Chips | 1.2 |
| Chromite | 1.6 |
| Calcium Carbonite | 9.7 |
| Graphite | 7.3 |
| Sisal | 5.8 |
| Phenolic Resin | 19.1 |
|  | 100.0. |

About 150 gms of the mixture was then added to the preform mold having a shape approximately that of the desired product. The material was compressed under 2,600 psi at room temperature for about 10 seconds. The pressure was released and the compacted preform was then placed in a hot press mold. The preform was molded at about 350° F. for 4 minutes at a pressure of about 1,850 psi. The cured pad was removed from the mold and post cured in an oven at 300° to 350° F. for 7 hours. The pad was machined to desired dimensions.

EXAMPLE 8

Another preferred method of manufacture and a disc pad brake lining for typical application in automobiles is given as follows:

Dry ingredients having the following composition were mixed in a Sigma Arm mixing vessel:

|  | WT % |
|---|---|
| Expanded Vermiculite | 45.0 |
| Phenolic Resin | 19.3 |
| Friction Particles | 5.9 |
| Chromite | 1.8 |
| Marblewhite | 9.1 |
| Graphite | 8.9 |
| Wollastonite | 5.0 |
| Sisal | 5.0 |
|  | 100.0 |

About 150 grams of the mixture was then added to a preform mold having a shape approximately that of the desired product. The material was compressed under 1900 psi at room temperature for about 2 seconds. The preform was then placed in a microwave oven for 30 seconds and then placed in a hot press mold. The preform was molded at 310° F. for two minutes at a pressure of 1800 psi. The molded disc pad was removed from the mold and post cured in an oven at 300°-350° F. for 7 hours. The pad was machined to desired dimensions.

EXAMPLE 9

An alternate preferred method of manufacture and a disc pad brake block for typical application in heavy duty trucks is given as follows:

Dry ingredients having the following composition are first thoroughly blended in a Littleford mixer:

|  | Wt. % |
|---|---|
| Expanded Vermiculite | 34.1 |
| Friction Particles | 5.5 |
| Brass Chips | 1.0 |
| Chromite | 1.7 |
| Graphite | 12.7 |
| Phenolic Resin | 18.7 |
| Sisal | 5.1 |
| Wollastonite | 21.2 |
|  | 100.0 |

About 13 pounds of the dry ingredients having the above composition are compressed at 350 psi at room temperature for 20 seconds. The preform is then pressed to the desired shape by molding it in a hydraulic press at 310° F. for 14 minutes at a pressure of about 1250 psi. The cured contoured slab is then removed from the mold and placed in a curing oven for 7 hours at 300° to 350° F. The contoured slab is then cut, finish ground and drilled to specification.

What is claimed is:

1. A friction material for use as a brake lining and the like comprising expanded vermiculite having an average minimum particle size of about 0.15 mm. and a thermosetting resin, said vermiculite and thermosetting resin being present in the friction material in a weight ratio of resin-to-vermiculite in a range from about 1.5/1 to 0.15/1, having no more than 15% of fibrous material either alone or in combination with acicular mineral particles.

2. A friction material as in claim 1, further comprising from 5% to 7.5% by weight of sisal.

3. A friction material as in claim 1, further comprising from 0% to 7.5% by weight of glass fibers.

4. A friction material as in claim 1, further comprising from 0% to 7.5% by weight of wollastonite.

5. A friction material as in claim 1, further comprising a total of from 5% to 15% by weight of sisal and glass fibers.

6. A friction material as in claim 1, further comprising a total of from 5% to 15% by weight of sisal and wollastonite.

7. A friction material as in claim 1 comprising 3% to 7.5% by weight of sisal and 5% to 30% by weight of wollastonite.

8. A friction material as in claim 1, further comprising from 6.75% to 18% by weight of graphite.

9. A friction material as in claim 2, further comprising from 0.7% to 2.0% by weight of chromite.

10. A brake lining material comprising:
  a. an expanded grade vermiculite having a three-dimensional accordian-like structure with a typical particle maximum diameter of 1 mm and length of 3 mm, said vermiculite being present in an amount of from 25% to 50% by weight of total composition;
  b. a thermosetting resin having heat-resistant properties sufficient to withstand temperatures of up to 1000° F., said resin being present in an amount of from 17% to 19% by weight of total composition;
  c. a non-asbestos fiber material, said fiber material imparting non-surface-cracking characteristics to said brake lining material, said fiber material being present in an amount not to exceed 15% by weight of total composition, said fiber material comprising:
    1. at least 5% of sisal having a fiber length of about ¼ inch and a cross-sectional area of $49 \times 10^{-6}$ square inch, and
    2. 5% of a milled fiberglass having an average fiber length of 1/16 inch and a cross-sectional area of $7.8 \times 10^{-6}$ square inch; and
  d. a filler material at least partially comprising:
    1. cashew-based friction particles,
    2. brass chips having an average particle size of about 0.4 mm $\times$ 3 mm,
    3. chromite ore having the approximate composition of 40 wt% $Cr_2O_3$, 25 wt% $Fe_2O_3$, 15 wt% $Al_2O_3$, 14 wt% MgO, and 6 wt% $SiO_2$, said chromite ore being present in an amount of from 1.4% to 2.0% by weight of total composition, and
    4. powdered graphite, said graphite being present in an amount of from 6.75% to 13.5% by weight of total composition, said filler material comprising from 0% to 60% by weight of the total brake lining composition.

11. A brake lining material as in claiim 10 in which component (c) (2) consists of about 20% of an acicular mineral particle having an average length of 1/16 inch and a cross-sectional area of $7.8 \times 10^{-6}$ square inch.

12. A brake lining material as in claim 11 in which the acicular mineral particles is wollastonite.

13. A brake lining material as in claim 12 in which the wollastonite is present in the amount of 5 to 30% by weight.

14. A friction material for use as a brake lining comprising;
  a. a thermosetting resin,
  b. a filler material, and
  c. a non-fibrous material selected from the group consisting of natural minerals, synthetic minerals and mineral-like materials, capable of being shaped in a three-dimensional form at ambient temperatures and at pressures of 1700 to 2600 p.s.i., and as so shaped having on compression a green strength in the order of 2 to 25 p.s.i., and
  d. a fiber material, said fiber material being present in an amount not to exceed 15% by weight of said friction material, and
  e. an acicular mineral particle, said acicular mineral particle being present in an amount not to exceed 30% by weight of said friction material.

15. A friction material as in claim 14, wherein said non-fibrous material is expanded vermiculite.

16. A friction material for use as a brake lining and the like comprising expanded vermiculite having an average minimum particle size of about 0.15 mm. and a thermosetting resin, said vermiculite and thermosetting resin being present in the friction material in a weight ratio of resin-to-vermiculite in a range from about 1.5/1 to 0.15/1, having no more than 30% by weight of non-asbestos acicular mineral particles.

17. A friction material as set forth in claim 16 wherein said acicular mineral particles have an average length of 1/16 inch and cross-sectional area of $7.8 \times 10^{-6}$ square inch.

* * * * *